United States Patent
Genevrier et al.

(10) Patent No.: US 10,495,662 B2
(45) Date of Patent: Dec. 3, 2019

(54) MULTIFUNCTION PROBE FOR PRIMARY REFERENCES FOR AIRCRAFT, ASSOCIATED MEASURING SYSTEM, AIRCRAFT AND METHOD FOR OBTAINING PHYSICAL QUANTITIES

(71) Applicant: THALES, Courbevoie (FR)

(72) Inventors: Gilles Genevrier, Valence (FR); Jacques Mandle, Valence (FR); Cédric Flaven, Valence (FR); Jean-Pierre Schlotterbeck, Valence (FR)

(73) Assignee: Thales, Courbevoie (FR)

( * ) Notice: Subject to any disclaimer, the term of this patent is extended or adjusted under 35 U.S.C. 154(b) by 796 days.

(21) Appl. No.: 15/132,978

(22) Filed: Apr. 19, 2016

(65) Prior Publication Data

US 2016/0305977 A1    Oct. 20, 2016

(30) Foreign Application Priority Data

Apr. 20, 2015   (FR) ...................................... 15 00819

(51) Int. Cl.
*G01P 3/36*   (2006.01)
*G01P 13/02*   (2006.01)
(Continued)

(52) U.S. Cl.
CPC ............ *G01P 13/025* (2013.01); *B64D 43/02* (2013.01); *G01C 23/00* (2013.01); *G01P 5/14* (2013.01);
(Continued)

(58) Field of Classification Search
CPC .. G01P 13/025; G01P 5/14; G01P 5/26; G01P 21/025; B64D 43/02; G01C 23/00;
(Continued)

(56) References Cited

U.S. PATENT DOCUMENTS

| | | | |
|---|---|---|---|
| 2005/0126282 A1* | 6/2005 | Maatuk | G01F 23/246 73/295 |
| 2012/0118075 A1* | 5/2012 | Golly | G01P 5/14 73/861.42 |
| 2013/0289804 A1* | 10/2013 | Covington | G01C 23/00 701/14 |

FOREIGN PATENT DOCUMENTS

| | | |
|---|---|---|
| FR | 2725034 A1 | 3/1996 |
| FR | 2953934 A1 | 6/2011 |

OTHER PUBLICATIONS

Young, Hugh D. and Roger A. Freedman. "University Physics", 11th Ed. vol. 1. 2004. p. 327. (Year: 2004).*
https://www.dictionary.com/browse/imaginary (Year: 2019).*

* cited by examiner

*Primary Examiner* — Samantha K Abraham
(74) *Attorney, Agent, or Firm* — Knobbe, Martens, Olson & Bear, LLP (57) ABSTRACT

A multifunction probe for primary references for an aircraft, an associated measuring system, aircraft and method for obtaining physical quantities are disclosed. In one aspect, the multifunction probe includes a base designed to be fastened on the cockpit of an aircraft, a plurality of static pressure taps arranged through the base and connected to pressure measuring devices and an optical window transparent to laser radiation and positioned in the base for the passage of laser radiation through the base. The multifunction probe further includes at least one laser anemometry optical head positioned to take laser anemometry measurements through the optical window and a static temperature probe mounted on the base.

12 Claims, 4 Drawing Sheets

(51) Int. Cl.
*G01S 17/58* (2006.01)
*G01C 23/00* (2006.01)
*B64D 43/02* (2006.01)
*G01P 5/14* (2006.01)
*G01P 5/26* (2006.01)
*G01P 21/02* (2006.01)
*G01S 17/02* (2006.01)
*G01S 17/95* (2006.01)
*G01S 7/481* (2006.01)

(52) U.S. Cl.
CPC .............. *G01P 5/26* (2013.01); *G01P 21/025* (2013.01); *G01S 7/4813* (2013.01); *G01S 17/023* (2013.01); *G01S 17/58* (2013.01); *G01S 17/95* (2013.01); *Y02A 90/19* (2018.01)

(58) Field of Classification Search
CPC ...... G01S 7/4813; G01S 17/023; G01S 17/58; G01S 17/95; Y02A 90/19
See application file for complete search history.

MULTIFUNCTION PROBE FOR PRIMARY REFERENCES FOR AIRCRAFT, ASSOCIATED MEASURING SYSTEM, AIRCRAFT AND METHOD FOR OBTAINING PHYSICAL QUANTITIES

CROSS-REFERENCE TO RELATED APPLICATIONS

This application claims the benefit under 35 U.S.C. § 119 of French Application No. 15 00819, filed Apr. 20, 2015, which is herein incorporated by reference in its entirety.

BACKGROUND

Technological Field

The described technology generally relates to a multifunction probe of primary references for aircraft.

Description of the Related Technology

In aeronautics, the piloting of an aircraft is based on knowledge of the primary references thereof. These references comprise, inter alfa, its speed relative to the ambient air, the temperature, its altitude and its angle of attack.

These references are determined via probes situated on the cockpit of the aircraft. In a known manner, these probes may comprise pitot tubes and static pressure probes for measuring the total and static pressure, respectively, as well as angle of attack probes and laser anemometer probes, called Light Detection and Ranging (LIDAR) probes, which send and receive laser radiation along one or more axes.

These probes are then connected to a capability for measuring and computing corresponding primary references of the aircraft, such as its altitude, angle of attack, relative airspeed, etc.

The measurements are next grouped together and displayed on a screen of the Electronic Flight Instrument System (EFIS), which is a central information source from which the aircraft is piloted.

In a known manner, the angle of attack probes and pitot tubes assume the form of pallets and tubes protruding from the skin of the aircraft.

As a result, they are exposed to meteorological or mechanical factors that may alter their operation.

These factors, for example, comprise:
plugging of the probe orifices by dust or insects,
lightning strikes,
avian impacts during flight,
mechanical impacts occurring on the ground, and/or
icing.

As shown by the databases inventorying aeronautic incidents, these factors are a source of failures for protruding probes. These failures can result in erroneous measurements.

In order to offset these problems, the aeronautic certification rules require having redundant primary reference measurement capabilities on the aircraft.

The commonly used solutions consist of having back-up probes, or combining a redundant probe with a pre-existing probe.

Furthermore, multifunctional probes exist for example combining static and total pressure probes with a temperature probe.

However, these solutions are not fully satisfactory.

In fact, most of the existing redundant probes are of the protruding type, and consequently have failure risks of the same nature as the probes that they are intended to back up.

A primary reference probe of the aforementioned type is described in FR 2,994,273. However, such a probe does not in itself allow the determination of all of the primary references, and an anemo-barometric measuring system comprising such a probe needs data other than that measured by the probe, or by a second probe of the same type, to determine the set of primary references.

Lastly, the combination of a probe with a pre-existing probe may require a new certification of the resulting probe if its geometry is altered.

SUMMARY OF CERTAIN INVENTIVE ASPECTS

One objective of the described technology is therefore to propose a multifunction probe of primary references for an aircraft making it possible, by itself or in combination with other probes of the same type, to determine additional primary references and that does not involve modifying the skin of the aircraft, or recertifying the existing anemo-barometry of the aircraft.

To that end, one inventive aspect relates to a multifunction probe of primary references of the aforementioned type, comprising a static temperature probe mounted on the base.

Another aspect relates to a multifunction probe of primary references for an aircraft, comprising:
a base intended to be fastened on a cockpit of the aircraft,
a plurality of static pressure taps arranged through the base and connected to pressure measuring devices,
an optical window transparent to laser radiation and positioned in the base for the passage of laser radiation through the base, and
at least one laser anemometry optical head positioned to take laser anemometry measurements through the optical window.

Another aspect also relates to an anemo-barometric measurement system for an aircraft comprising at least one such multifunction probe, as well as an aircraft comprising at least one such multifunction probe and a method for obtaining a plurality of physical properties relative to an aircraft.

According to other advantageous, the multifunction probe of primary references further comprises one or more of the following features, considered alone or according to any technically allowable combination(s):

the optical window has an outer face flush with an outer surface of the base on the one hand, and a first inner face on the other hand, each optical head being on the side of the first inner face;

the static temperature probe comprises a wall having an outer face flush with an outer surface of the base and an inner face, the temperature probe comprising a sensitive element measuring the temperature positioned face to the inner face to measure the static temperature of a flow of air in contact with the outer face through the wall;

the static pressure taps, the static temperature probe and the optical window are near one another and comprised in a volume defined by an imaginary cylinder of revolution centered on an axis globally perpendicular to the base with a diameter smaller than 30 cm, desirably smaller than 15 cm;

the static pressure taps, the static temperature probe and each optical head are configured to perform measurements near another, at measuring points situated in a volume defined by an imaginary cylinder of revolution, centered on axis globally perpendicular to the base, with a diameter smaller than 30 cm, desirably smaller than 15 cm and a height smaller than 50 cm, desirably smaller than 15 cm;

the multifunction probe comprises a deicing system for the static pressure taps, suitable for commanding the deicing as a function of the temperature measured by the static temperature probe; and the base defines a receiving orifice for the static temperature probe, the multifunction probe of primary references comprises a thermal insulating seal for the static temperature probe relative to the base, inserted between the base and the static temperature probe, and the temperature probe comprises a thermal insulating device on its periphery.

Another aspect relates to an anemo-barometric measuring system for an aircraft comprising at least one multifunction probe of primary references connected to at least one device for computing physical properties relative to the aircraft as a function of measurements done by the multifunction probe(s) of primary references, at least one of the multifunction probes of primary references being as defined above.

Advantageously, each computing device is able to compute one or more physical properties relative to the aircraft chosen from among: the total temperature of the air moving around the aircraft, the true airspeed, the computed speed, the indicated speed, the angle of attack, the sideslip, the pressure altitude, the corrected pressure altitude, the standard altitude, the barometric rate of climb and the Mach number of the aircraft, as a function of the measurements of the static temperature, the static pressure and the local speed of the aircraft taken by each multifunction probe.

Another aspect also relates to an aircraft comprising at least one multifunction probe of primary references as described above.

Advantageously, for each multifunction probe of primary references, the temperature probe is closer to the ground than the static pressure taps, in the standard flight configuration of the aircraft.

Another aspect lastly relates to a method for obtaining a plurality of physical properties relative to an aircraft. According to the described technology, the method comprises the following steps:

providing a multifunction probe of primary references on the cockpit of the aircraft, measuring a static pressure near the aircraft via the static pressure taps, sending/receiving laser radiation from the inside of the aircraft to the outside of the aircraft through the optical window via the optical head to measure a speed of the aircraft, measuring a static temperature via the static temperature probe, and computing physical properties as a function of the measured static temperature, static pressure and speed of the aircraft.

BRIEF DESCRIPTION OF THE DRAWINGS

The described technology will be better understood and other advantages thereof will appear in light of the following description, provided solely as an example and done in reference to the appended drawings, in which.

DETAILED DESCRIPTION OF CERTAIN INVENTIVE EMBODIMENTS

Figure 1:
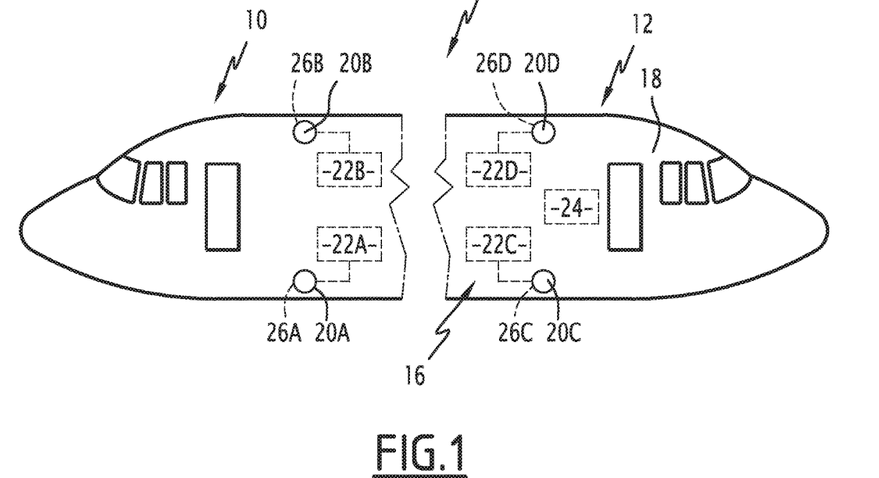
FIG. 1 is a partial diagrammatic illustration of two side faces of an aircraft comprising an anemo-barometric measuring system according to the described technology.

In FIG. 1, a left side face 10 and a right side face 12 of an aircraft 14 are shown.

The aircraft 14 comprises an anemo-barometric measuring system 16, configured to provide a complete set of anemo-barometric measurements, i.e., the primary references, to a pilot of the aircraft 14.

The aircraft 14 also comprises a fuselage or cockpit 18.

Figure 2:
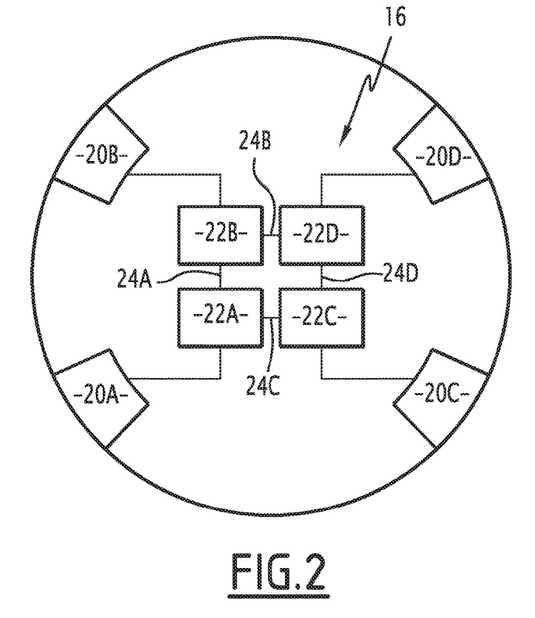
FIG. 2 is a diagrammatic illustration of the anemo-barometric measuring system of FIG. 1, comprising several multifunction probes for primary references according to the described technology.

The measuring system 16, shown in more detail in FIG. 2, comprises four multifunction probes 20A, 20B, 20C, 20D of primary references each associated with a respective computing module 22A, 22B, 22C, 22D configured to compute physical properties relative to the aircraft 14, i.e., in particular the primary references.

The computing modules 22A, 22B, 22C, 22D are onboard computers. The computing modules 22A, 22B, 22C, 22D are able to respectively recover the anemo-barometric measurements performed by the multifunction probes 20A, 20B, 20C, 20D and to exchange these measurements via communication channels 24A, 24B, 24C, 24D to compute the primary references. More specifically, the computing modules 22A, 22B, 22C, 22D and the communication channels 24A, 24B, 24C, 24D form a closed communication loop.

The cockpit 18 comprises several housings 26A, 26B, 26C, 26D intended to respectively receive the multifunction probes of primary references 20A, 20B, 20C, 20D.

The multifunction probes of primary references 20A, 20B, 20C, 20D are situated two by two on the left side face 10 and on the right side face 12.

More specifically, in FIG. 1, the multifunction probes of primary references 20A, 20B, 20C, 20D are positioned two by two on each side of the cockpit 18, on parts thereof situated in front of the wings (not shown).

In the rest of the description, only the multifunction probe of primary references 20A will be described using FIGS. 3 to 5, the other multifunction probes of primary references 20B, 20C, 20D being similar.

Furthermore, in the rest of the description, the term "outer" defines an element oriented toward the outside of the aircraft 14, i.e., away from the cockpit 18, and the term "inner" refers to an element oriented toward the inside of the aircraft 14.

The multifunction probe of primary references 20A comprises a base 28A and elements 30A for fastening the base 28A on the cockpit 18.

The multifunction probe of primary references 20A comprises a plurality of orifices, forming static pressure taps 32A arranged through the base 28A and connected to devices for measuring the static pressure, not shown, and for example comprised in the computer 22A.

The multifunction probe 20A comprises sleeve joints 33A intended to be mounted hermetically on a so-called "static pressure" channel (not shown) that connects the static pressure taps 32A and the static pressure measuring devices.

The multifunction probe 20A further comprises an optical window 34A transparent to laser radiation and inserted in the base 28A. The optical window 34A here is fixed on the base 28A using screws 36A.

Figure 5:
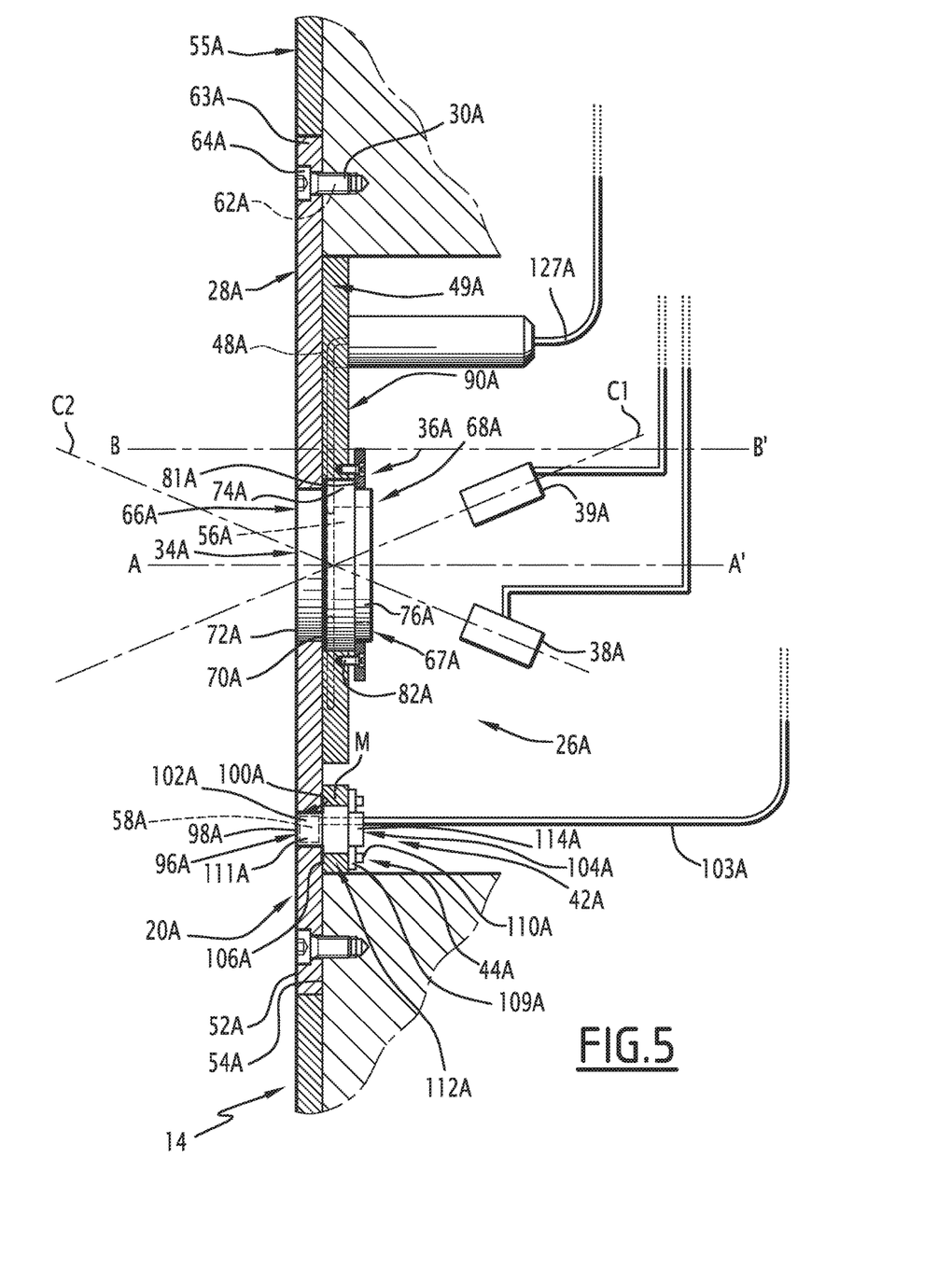
FIG. 5 is a sectional view of the multifunction probe of primary references of FIGS. 3 and 4, positioned on the cockpit of an aircraft.

The multifunction probe 20A comprises optical laser anemometry heads 38A, 39A, for example, and as shown in FIG. 5, of which there are two.

Each optical head 38A, 39A is able to emit an emitted laser radiation and to receive a corresponding backscattered laser radiation.

Each optical head 38A, 39A is, for example, configured to generate the laser radiation and to provide a corresponding electronic processing device, not shown, capable of performing laser anemometry computations, with measurements relative to the backscattered radiation.

In other words, each optical head 38A, 39A and each electronic processing device forms a laser anemometer associated with the multifunction probe 20A.

In the various drawings, the anemometers, and in particular the electronic processing devices, are not shown in detail, and only the optical heads 38A, 39A are shown.

Each optical head 38A, 39A is in particular connected to the electronic processing device of the corresponding laser anemometer, for example, by an optical link.

Each laser anemometer is, for example, like those described in documents FR 2,953,934 and FR 2,725,034.

Each laser anemometer comprises, in a known manner, for example, an optical head, a laser source for generating laser radiation, a photosensitive sensor for receiving the emitted laser radiation and the backscattered laser radiation, and an electronic processing device to perform laser anemometry computations as a function of the measurements of the photosensitive sensor.

Advantageously, the optical head incorporates a laser source and the photosensitive sensor is connected to the electronic processing device.

The electronic processing device is, for example, integrated into the computer 22A with which the multifunction probe 20A is associated.

The optical heads 38A, 39A are arranged face to the optical window 34A to perform laser anemometry measurements through the optical window 34A.

Each optical head 38A, 39A has a measuring axis C1, C2. The measuring axes C1, C2 of the optical heads 38A, 39A are inclined relative to one another. The measuring axes C1, C2 here are each inclined by a nonzero incline angle relative to a central axis A-A' of the optical window 34A. The central axis A-A' is perpendicular to the optical window 34A.

The incline angles of the measuring axes C1, C2 relative to the central axis A-A' are different. The measuring axis C1 of the optical head 38A is, for example, inclined by an angle of about +30° relative to the central axis A-A', while the measuring axis C2 of the optical head 39A is inclined by an angle equal to about −30° relative to the central axis A-A'.

The incline angles of the measuring axes C1, C2 of the optical heads 38A, 39A relative to the central axis A-A' are chosen as a function of the measuring needs for the aircraft in question.

More specifically, the anemometers together form a (LI-DAR) probe with two measuring axes able to perform laser anemometry measurements in a volume of air in which each emitted laser radiation is focused. The particles suspended in the volume of air in which the measurement is done then diffuse, in the form of backscattered laser radiation, part of each emitted laser radiation toward the optical heads 38A, 39A of the LIDAR probe.

The LIDAR probe is, for example, a very short-range probe and performs near-field measurements, inasmuch as the volume of air in which the emitted laser radiations are focused is, for example, less than 50 cm away from the optical window 34A.

Alternatively, the LIDAR probe is able to take far-field laser anemometry measurements, i.e., to focus each emitted laser radiation in a volume of air remote from the aircraft, to obtain information free from the influence of the aircraft. In this alternative, the volume of air in which each emitted laser radiation is focused is for example several meters away from the optical window 34A.

As described above, the properties of the emitted laser and backscattered radiations are then used by the LIDAR probe to provide a measurement of the relative airspeed of the aircraft along the measurement axis or axes.

The multifunction probe 20A also includes a static temperature probe 42A mounted on the base 28A and in particular inserted in the base 28A, and a capability 44A for fastening the temperature probe on the base 28A. The static temperature corresponds to the local temperature, i.e., at the multifunction probe 20A, of the ambient air surrounding the aircraft, in the absence of any disruption of the flow of air by the probe. The static temperature differs from the total temperature, which corresponds to the temperature of the air at a stagnation point.

The multifunction probe 20A lastly comprises a system 48A for deicing the static pressure taps 32A at a deicing zone 49A, which surrounds the optical window 34A and is in contact with the static pressure taps 32A.

The base 28A can be fastened on the cockpit 18 in the housing 26A, which has dimensions complementary to those of the base 28A.

In a known manner, the base 28A has an ovoid or circular general shape.

In the example of FIGS. 1 to 5, the base 28A has a generally circular shape and has a central axis that coincides here with the central axis A-A' of the optical window 34A.

Furthermore, the base 28A is made from a rigid material suitable for the mechanical, thermal and atmospheric stresses encountered during operation of the aircraft 14. In a known manner, the base 28A is made from a metal alloy, for example, aluminum, ceramic or any other material certified for aeronautics.

The base 28A comprises an outer surface 52A designed to be in contact with the outside atmosphere of the aircraft 14, and an inner surface 54A designed to be placed in the housing 26A, across from an inner space of the aircraft 14 defined by the housing 26A.

The outer surface 52A of the base 28A is substantially planar and is able to be flush with an outer surface 55A of the fuselage 18 of the aircraft 14 when the base 28A is fastened on the fuselage 18.

This type of mounting, called "flush" mounting, is well known by those skilled in the art and is able to minimize the disruption of the pressure field and flow that the presence of an object or interface between two objects creates in its vicinity.

As illustrated in FIG. 5, the inner surface 54A of the base 28A is substantially planar and parallel to the outer surface 52A of the base 28A.

Furthermore, this inner surface 54A is oriented toward the inside of the aircraft 14, while the deicing zone 49A is situated along the inner surface 54A.

Advantageously, the base 28A is made entirely from a material transparent to laser radiation.

The base 28A defines a first orifice 56A for receiving the optical window 34A, and a second orifice 58A for receiving the static temperature probe 42A.

The receiving orifice 56A of the optical window 34A has a shape complementary to that of the optical window 34A.

The receiving orifice 56A is arranged through the base 28A and emerges in the outer surface 52A and the inner surface 54A.

Figure 3:
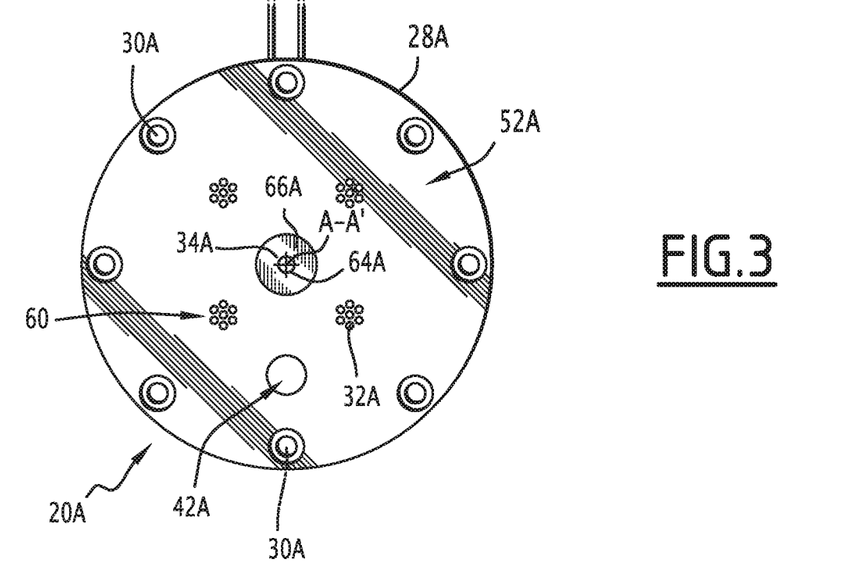
FIG. 3 is a front view of one of the multifunction probes of primary references of the measuring system of FIG. 2.

In the example illustrated in FIG. 3, the receiving orifice 56A has a generally cylindrical shape centered on the central axis A-A'.

Furthermore, the receiving orifice 56A of the optical window 34A is situated on the base 28A in a location able to minimize the pressure and flow disruptions caused by the presence of the optical window 34A.

Figure 4:
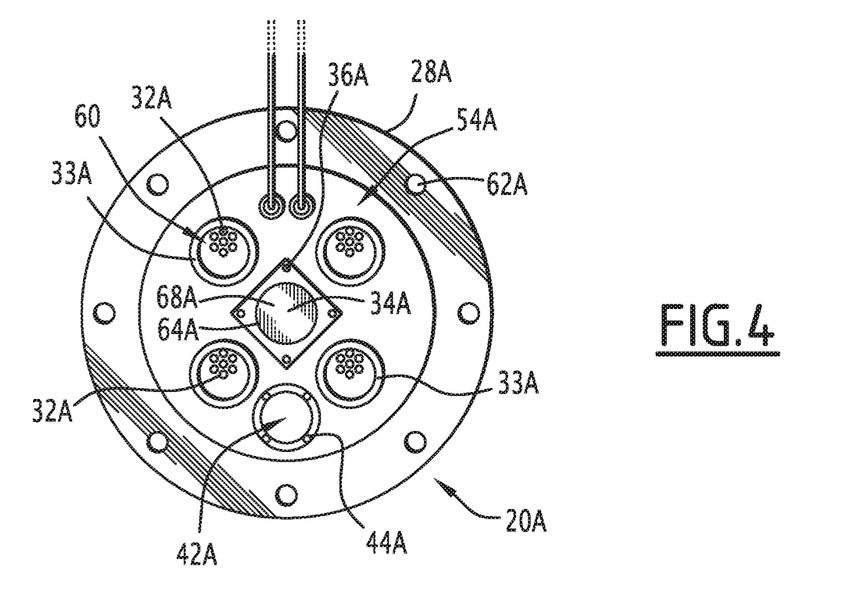
FIG. 4 is a rear view of the multifunction probe of primary references of FIG. 3.

In the example of FIGS. 3 to 5, the receiving orifice 54A is positioned at the center of the base 28A.

The receiving orifice 58A is arranged through the base 28A and emerges in the outer surface 52A and the inner surface 54A.

The receiving orifice 58A has a shape complementary to that of the temperature probe 42A.

The receiving orifice 58A is situated on the base 28A in a location able to minimize the pressure and flow disruptions caused by the presence of the temperature probe 42A.

The base 28A defines the orifices forming the static pressure taps 32A, which are gathered by group 60.

In the example FIGS. 3 and 4, the base 28A comprises four groups 60 of several static pressure taps 32A regularly spaced around the central axis A-A'.

The base 28A also defines orifices 62A for receiving fastening elements 30A for fastening the base 28A to the cockpit 18.

The receiving orifices 62A for the fastening elements 30A are arranged through a peripheral flange 63A delimited at the periphery of the base 28A.

They are able to minimize the portion of the fastening elements 30A protruding outside the base 28A.

To that end, each receiving orifice 62A has a shape substantially complementary to the shape of the fastening elements 30A. More specifically, the fastening elements 30A comprise a head designed to be completely received in one of the corresponding receiving orifices 62A using a flush mount, i.e., such that said head is flush with the outer surface of the base 28A.

In the example of FIG. 5, the fastening elements 30A are formed by flathead screws 64A. The head of each screw has a general shape suitable for cooperating with each receiving orifice 62A and also has a planar surface designed to be flush with the outer surface 52A. The screws 64A are designed to be engaged with sleeve joints arranged in the cockpit 18.

The static pressure taps 32A are flush with the outer surface 52A of the base 28A.

The static pressure taps 32A are able to allow the atmosphere outside the aircraft 14 to penetrate the multifunction probe 20A, toward the static pressure measuring devices.

The static pressure taps 32A are arranged in the thickness of the base 28A, have a generally circular shape and emerge in the outer surface 52A and in the inner surface 54A.

The static pressure taps 32A of each group 60 are positioned so as to occupy the apices of a regular polygon, for example, a hexagon, one of the static pressure taps 32A being located at the center of the polygon.

Each sleeve 33A has a generally cylindrical shape with a respective axis substantially parallel to the central axis A-A'. Each sleeve 33A is placed around a group 60 of static pressure taps 32A.

Each sleeve 33A is fastened on the inner surface 54A of the base 28A across from a group 60 of static pressure taps 32A, that group 60 of static pressure taps 32A emerging in the sleeve 33A.

The static pressure line connected to the sleeve 33A thus undergoes an atmosphere having substantially the pressure prevailing outside the aircraft 14.

The optical window 34A is able to allow the passage of the laser radiation used by the LIDAR probe to take a speed measurement while minimizing the disruptions of the pressure and flow field that the presence of the optical window 34A causes.

The exact position of the optical window 34A on the base 28A is computed, then tested to minimize the disruptions of the pressure field and the air flow.

Consequently, in reference to FIGS. 3 to 5, the optical window 34A is shown at the center of the base 28A, but may be positioned thereon in a more suitable location defined through those computations and tests.

The optical window 34A has, on the one hand, a first outer face 66A flush with the outer surface 52A of the base, and on the other hand, a first inner face 67A, on the side of which the optical heads 38A, 39A are positioned.

Advantageously, the first outer face 66A is planar.

The dimensions of the optical window 34A are adapted to the optical heads 38A, 39A, which are separate from the optical window 34A and attached to the multifunction probe 20A. Alternatively, the optical window 34A and the optical heads 38A, 39A are made in a single piece of material.

The optical window 34A comprises a first porthole 68A transparent to laser radiation.

The first porthole 68A is made using an optical material suitable for laser radiation with a wavelength substantially equal to 1550 nm. It is received through the base 28A.

Desirably, the diameter of the porthole 68A of the optical window 34A is comprised between 1 cm and 6 cm.

The porthole 68A is advantageously made from glass transparent to infrared radiation, for example, radiation with a wavelength substantially equal to 1550 nm.

When it is mounted on the base 12, the first porthole 68A is flush with the outer surface 52A of the base 28A.

As illustrated by FIG. 5, the porthole 68A comprises a cylindrical outer part 72A, an annular intermediate part 74A and an inner part 76A that is also cylindrical.

The outer 72A, intermediate 74A and inner 76A parts are integral.

The outer part 72A is received through the receiving orifice 56A. It has the first outer face 66A that is flush with the outer surface 52A and in contact with the atmosphere outside the aircraft 14.

Indeed, when the aircraft 14 is in flight, the first outer face 66A is subject to a pressure lower than the pressure to which the inner part 76A of the first porthole 68A is subjected.

The intermediate part 74A forms a collar. It has a diameter larger than that of the outer part 72A and the inner part 76A.

The intermediate part 74A bears on the inner surface 54A of the base 28A.

When the aircraft 14 is in flight, the pressure difference tends to press the intermediate part 74A against the inner surface 54A of the base 28A.

The porthole 68A is maintained by an annular flange 81A fixed on the base 28A, here on the deicing zone 49A. The flange 81A is for example fixed on the deicing zone via screws 82A.

The flange 81A is engaged on the inner part 76A and grips the intermediate part 74A against the base 28A.

A sealing gasket 70A is provided to ensure the sealing between the optical window 34A and the base 28A, in particular by compensating the thermal expansion differential of the porthole 68A and the base 28A.

The seal 70A is annular and positioned around the outer part 72A of the porthole 68A. The seal 70A is positioned axially between the intermediate part 74A and the base 28A.

Thus, the intermediate part 74A bears on the inner surface 54A of the base 28A via the seal 70A, which thus isolates the orifice 56A from the inside of the aircraft 14.

The seal 70A is made so as to have a thermal expansion coefficient lower than that of the material of the base 28A.

The seal 70A comprises an INVAR ring, which is an alloy of iron and nickel with a low thermal expansion coefficient also known under the name Fe—Ni36%. The ring is coated with a hard rubber sheath also having a low thermal expansion coefficient.

Alternatively, the seal 70A comprises a stack of three coaxial rings with a same diameter, the central ring of which is made from INVAR and the other two rings of which are made from rubber.

Due to the presence of the seal 70A, when the base 28A expands and the receiving orifice 56A and housing 26A deform, the porthole 68A moves little along the central axis A-A' in the receiving orifice 56A. The alignment of the planar face 66A and the outer surface 52A is then preserved. Thus, the flush nature of the mounting of the optical window 34A on the base 28A and the sealing of the optical window 34A are preserved.

The static temperature probe 42A is known and is, for example, made from a material identical to the material forming the rest of the multifunction probe 20A. Thus, the expansion differential as a function of the temperature is limited.

In a known manner, there are many models of static temperature probes 42A, and only one example thereof will be described below.

The minimum distance between the static pressure taps 32A and the static temperature probe 42A is chosen to limit the interactions between sensors in accordance with the recommendations and regulations in force in the aeronautics field. The minimum distance between the static pressure taps 32A and the static temperature probe 42A is, for example, equal to 0.5 cm, desirably equal to 2 cm.

More generally, the minimum distance between the temperature probe 42A and the deicing system 48A is chosen to limit the interactions between sensors, and in particular to limit the influence of the deicing system 48A on the temperature measurements from the temperature probe 42A. The minimum distance between the static pressure taps 42A and the deicing system 48A is, for example, greater than 0.5 cm, desirably greater than 2 cm.

The multifunction probe 20A is arranged in the cockpit 18 of the aircraft 14 such that the temperature probe 42A is closer to the ground than the static pressure taps 32A in the standard flight configuration of the aircraft.

Thus, the separation of the temperature probe 42A from the static pressure taps 32A and the deicing system 48A, and its positioning in the lower part of the aircraft relative to the static pressure taps 32A, makes it possible limit the influence of the deicing system on the temperature measured by the temperature probe 42A.

The temperature probe 42A comprises a contact wall 96A with the surrounding air, defining a second outer face 98A oriented toward the outside of the aircraft 14 and in contact with the air surrounding aircraft 14, and a second inner face 100A across from the inside of the aircraft 14 and complementary to the outer face 98A.

The second outer face 98A is flush with the outer surface 52A of the base 28A. Advantageously, the second outer face 98A is planar.

The temperature probe 42A comprises a temperature-sensitive element 102A that is, in the example described in FIG. 5, a resistance.

More specifically, in the example of FIG. 5, the temperature probe 42A comprises a temperature-sensitive element 102A that is arranged on the second inner face 100A and a capability, not shown, for measuring a characteristic property of the sensitive element 102A, such as its resistance, or the variation of the characteristic property of the sensitive element 102A. The temperature-sensitive element 102A is, for example, welded on the second inner face 100A or embedded in an insulator occupying an inner space of the probe 42A.

The temperature probe 42A is able to measure, via the measurement of the characteristic property of sensitive element 102A, the temperature of a flow of air in contact with the second outer face 98A. More generally, the sensitive element 102A is comparable to a capability for measuring the temperature positioned across from the inner face, and configured to measure the static temperature of a flow of air in contact with the outer face 98A through the wall 96A.

The temperature probe 42A is connected to the computing module 22A via an electric link 103A and the computing module 22A is configured to determine the static temperature as a function of the measurements of the value of the characteristic property.

The exact position of the temperature probe 42A, and in particular of the contact wall 96A, on the base 28A is computed, then tested to minimize the disruptions of the pressure field and the air flow.

The temperature probe 42A comprises a case 104A, inside which the sensitive element 102A is received. The temperature probe 42A is provided with a thermally insulating seal 106A inserted between the case 104A and the base 28A to thermally insulate the temperature probe 42A from the base 28A.

The case 104A is fastened to the base 28A via the fastening capability 44A, which comprises a flange for retaining the temperature probe 42A and screws 110A for fastening the retaining flange 109A to the base 28A.

The case 104A comprises a cylindrical outer part 111A, an intermediate part 112A, and an inner part 114A that is also cylindrical.

The outer part 111 A comprises the second outer face 98A that is flush with the outer surface 52A and is in contact with the atmosphere outside the aircraft 14.

The intermediate part 112A forms a collar defining a hollow ring filled with a thermally insulating material M, such as polyether ether ketone. In other words, the temperature probe 42A comprises, on its periphery, a device for thermally insulating the temperature probe 42A relative to the housing 26A and the inside of the aircraft 14.

Advantageously, in a known manner, the outer 111A, intermediate 112A and inner 114A parts are replaced by an insulating material limiting the exchanges between the sensitive element 102A and the inside of the aircraft. The intermediate part 112A has a diameter larger than those of the outer part 111A and the inner part 114A.

The intermediate part 112A bears on the inner surface 54A of the base 28A.

When the aircraft 14 is in flight, the pressure difference tends to press the intermediate part 112A against the inner surface 54A of the base 28A.

The case 104A is maintained by the retaining flange 109A fastened on the base 28A.

The flange 109A is engaged on the inner part 114A and grips the intermediate part 112A against the base 28A.

Advantageously, a thermally insulating seal is positioned between the retaining flange 109A and the intermediate part 12 and extends around the inner part 114A.

The seal 106A is positioned around the outer part 111A of the case 104A. The seal 106A is positioned axially between the intermediate part 112A and the base 28A, and also between walls defining the second orifice 58A and the outer part 111A.

Thus, the intermediate part 112A bears on the inner surface 54A of the base 28A by means of the seal 106A.

The seal 106A is made so as to have a thermal expansion coefficient lower than that of the material of the base 28A. The seal 106A is for example made from polyether ether ketone.

The seal 106A allows thermal insulation of the orifice 58A and the sensitive element 102A from the base 28A.

The deicing system 48A is arranged in the base 28A at the deicing zone 49A.

In a known manner, the deicing system 48A is able to clear the static pressure taps 32A when they are obstructed by ice or frost.

Advantageously, the deicing system 48A is suitable for controlling the deicing as a function of the temperature measured by the static temperature probe 42A and, if needed, characteristics of the signals processed by the LIDAR probe.

To that end, the deicing system 48A comprises electrical resistances or one or more resistive wires connected to the supply capability 127A and embedded in the material of the deicing zone 49A.

In the example of FIG. 5, the deicing system 48A comprises a plurality of resistive wires wound around portions of the sleeve joints 33A.

When electricity is supplied to the deicing system 48A, the wires heat the deicing zone around the static pressure taps 32A in order to melt the ice or frost obstructing them.

The deicing zone 49A has a generally cylindrical shape centered on an axis B-B' parallel to the axis A-A' and offset relative to the axis A-A', with a diameter smaller than the diameter of the base 28A. More specifically, the distance between the axis B-B' and the temperature probe is greater than the distance between the axis A-A' and the temperature probe.

The deicing zone 49A is made from a material similar to the material of the base 28A.

The deicing zone 49A is, for example, separated from the temperature probe 42A or thermally insulated from the temperature probe 42A using the material M of the part 112A.

The deicing zone 49A is fastened on the inner surface 54A of the base 28A. In the example of FIG. 5, it is for example welded on the inner surface 54A.

The deicing zone 49A is longitudinally delimited opposite the outer surface 54A by the wall 90A in which passage apertures are arranged for the fastening screws 36A for the optical window.

The deicing zone 49A also comprises a housing for insertion of the optical window 34A.

The height of the deicing zone 49A along the central axis A-A' is substantially equal to the thickness of the base 28A.

Lastly, and as illustrated in FIG. 5, the supply capability 127A of the deicing system 48A emerges on the wall 90A.

The static pressure taps 32A, the optical window 34A and the static temperature probe 42A are near one another and are comprised in an imaginary cylinder of revolution, centered on an axis globally perpendicular to the base, with a diameter smaller than 30 cm, desirably smaller than 15 cm. The set of measurements done by the static pressure taps 32A, the anemometers and the static temperature probe 42A are done near one another and the corresponding measuring points are situated in an imaginary cylinder of revolution, centered on an axis globally perpendicular to the base 28A, with a diameter smaller than 30 cm, desirably smaller than 15 cm, and a height smaller than 50 cm, desirably smaller than 15 cm.

In other words, the measuring points relative to the measurements done by the static pressure taps 32A, the anemometers and the static temperature probe 42A are near one another.

Thus, the LIDAR probe with two measuring axes, the static pressure taps and the static temperature probe 42A are configured to take their respective measurements near one another at the measuring points situated in the imaginary cylinder of revolution with the diameter and height presented above.

In the rest of the description, only the computing module 22A will be described using FIG. 1, the other computing modules 22B, 22C, 22D being identical.

The computing module 22A is configured to compute the physical properties relative to the aircraft 14, as a function of anemo-barometric measurements done by the multifunction probe of primary references 20A with which it is associated. The computed physical properties are, for example, the static temperature, the corrected static temperature, the local speed of the aircraft 14 relative to the flow of air surrounding it, the static pressure, the corrected static pressure and the altitude of the aircraft 14.

In the rest of the description, the corrected static temperature and corrected static pressure refer to the static temperature and static pressure values that are corrected for measuring errors related to the local aerodynamic field at the probe. The local speed corresponds to a speed vector, which is measured by the anemometers associated with the multifunction probe 20A, at measuring points situated approximately 15 cm from the optical window 34A.

The computing module 22A is configured to compute the corrected static temperature and static pressure, from static temperature, static pressure and local speed measurements of the aircraft on by the multifunction probe 20A. The correction in particular consists of minimizing the dynamic component of the pressure and temperature measurements, related to the fact that the local flow of air at the probe 20A is not necessarily parallel to the cockpit of the aircraft 14.

The computing module 22A is also able to compute the total temperature of the air moving around the aircraft and the Mach speed of the aircraft 14, from the static pressure measurement done by the temperature probe 42A, the local speed of the aircraft 14, measured by the anemometers associated with the multifunction probe 20A, and the static pressure measured by the computing module 22A. In other words, the computing module 22A is able to compute the total temperature of the air and the Mach speed of the aircraft 14, from static temperature, static pressure and local speed measurements done by a same multifunction probe 20A.

More generally, the computing module 22A is able to compute physical properties relative to the aircraft 14 chosen from among: the total temperature of the air moving around aircraft 14, the true airspeed, the computed speed, the indicated airspeed, the angle of attack of the aircraft, the sideslip of the aircraft 14, the pressure altitude, the corrected pressure altitude, the static altitude, the barometric rate of climb and the Mach number of the aircraft, based on the static temperature, static pressure and local speed measurements of the aircraft 14 done by the multifunction probe 20A or each multifunction probe 20A, 20B, 20C, 20D.

Advantageously, the computing module 22A is configured to command the deicing system 48A as a function of the temperature measured by the static temperature probe 42A.

Advantageously, the computing module 22A is configured to group together and process the physical properties computed by the other computing modules 22B, 22C, 22D.

The computing module 22A is, for example, configured to recover the static pressure static temperature values measured, then corrected by one of the two multifunction probes 20C, 20D arranged on the right side face and the corresponding computing module 20C, 20D. The computing module 22A is then able to determine, as a function of the recovered corrected pressure and temperature values, a static pressure and a static temperature corrected for the influence of the aircraft 14, in particular independent of the angle of attack and sideslip of the aircraft 14. The computing module 22A, for example, comprises a software program for computing an average of the recovered corrected static pressure and corrected static temperature values, in order to obtain the static pressure and static temperature corrected for the sideslip and angle of attack of the aircraft 14. The computing module 22A is also configured to compute the computed speed of the aircraft 14, which corresponds to the speed of the aircraft 14 under standard atmospheric conditions, at sea level, from static pressure measurements done on the right and left side faces, of the static temperature and the local speed.

Also advantageously, the computing module 22A stores a matrix for converting local measurements into infinite upstream measurements of the aircraft 14 determined following tests done in flight. The computing module 22A is thus able to convert the local measurements done by the multifunction probes 22A, 22B, 22C, 22D into infinite up stream measurements.

Alternatively, the computing module 22A is configured to compute the static pressure corrected for sideslip of the aircraft 14 and the static temperature corrected for sideslip of the aircraft 14 from static pressure, static temperature and speed values of the aircraft 14 relative to the air, measured via the static pressure taps 32A, the static temperature probe 42A and the anemometers associated with the multifunction probe 20A. In this alternative, the anemometers are, for example, able to perform a local speed measurement, at measuring points situated approximately 10 cm from the optical window 34A, and a short-range speed measurement, at measuring points situated between 3 and 5 meters from the optical window 34A. Such measurements in particular make it possible to determine a sideslip angle of the aircraft 14 and thus to determine the static pressure and static temperature corrected for sideslip of the aircraft 14.

Also advantageously, the computing module 22A is configured to predict an ice situation at the static pressure taps 32A of the multifunction probes as a function of the temperature measurements performed by the multifunction probe 20A or the different multifunction probes 20A, 20B, 20C, 20D.

Also advantageously, the computing module 22A is configured to detect an operating defect of the static pressure probes 32A, static temperature probe 42A or each anemometer associated with the multifunction probe 20A by comparing the values measured by the different multifunction probes 20A, 20B, 20C, 20D.

More generally, the measurements performed by the static pressure taps 32A, the anemometers and the static temperature probe 42A are said to be linked, inasmuch as they are performed near one another and therefore with spatially and temporally related errors due to the local aerodynamic field. Thus, the static pressure and temperature measurements can be corrected from the local speed measured via the anemometers, by in particular eliminating the dynamic component of these measurements, related to the fact that the flow of air surrounding the aircraft is not necessarily parallel to the cockpit of the aircraft 14 or that the multifunction probe is not positioned perfectly parallel to a central axis of the aircraft 14.

The fact that the measurements performed by the static pressure taps 32A, the anemometers and the static temperature probe 42A are linked and performed from measuring spaces confined in a limited volume makes it possible to obtain temperature, static pressure and local speed measurements in a location where the Mach number of the aircraft is globally identical.

Furthermore, the fact that the optical window 34A and the temperature probe 42A each comprise first and second outer surfaces, respectively, flush with the base 28A, which is flush with the cockpit 18 of the aircraft 14, makes it possible to obtain a non-protruding multifunction probe 20A, which does not cause any disruption to the pressure field adjacent to the multifunction probe. This makes it possible to limit the risks of malfunction of the multifunction probe 20A under difficult weather or mechanical conditions. Indeed, the risks of blocking of the orifices of the multifunction probe, lightning, avian impacts during flight suffered by the probe, mechanical impacts occurring on the ground, and ice are limited owing to the non-protruding characteristic of the multifunction probe 20A.

Furthermore, it is the fact that the different measurements performed by the multifunction probe 20A are related that makes it possible to choose a non-protruding configuration for the multifunction probe 20A, since if all of these measurements were independent, it would be preferable to use at least one protruding probe and in particular a completely protruding temperature probe, in order to limit the complexity of the computations necessary to obtain the primary references. Indeed, if the measurements were not linked, it would be preferable to take independent measurements of the Mach number of the aircraft and therefore use at least one protruding probe.

The static pressure 32A, the optical window 34A and the static temperature probe 42A are said to be co-localized and thus make it possible to obtain all of the anemo-barometric measurements allowing the determination of the primary references necessary for the flight of the aircraft 14 with an optimized precision and correction.

The fact that the static pressure taps 32A, the optical window 34A and the static temperature probe 42A are on the same base makes it possible to limit the disruptions of the pressure and flow field, to prevent the optical window and the temperature probe 42A from disrupting the static pressure measurement, to facilitate the installation of the multifunction probe 20A, and to control the position of the static pressure taps 32A, the optical window 34A and the static temperature probe 42A relative to one another.

Figure 6:
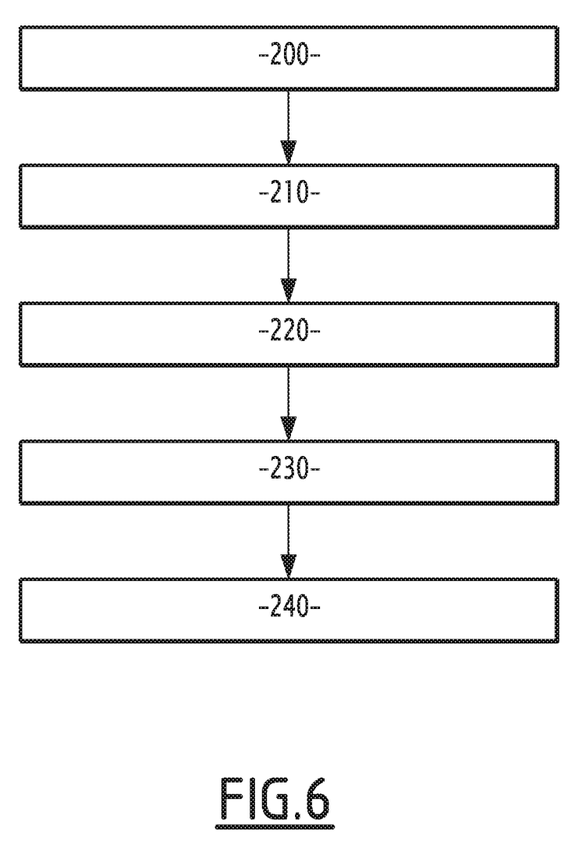
FIG. 6 is a block diagram of a method for obtaining a plurality of physical properties relative to an aircraft via the multifunction probe of primary references of FIGS. 4 and 5.

In reference to FIG. 6, the method for implementing a measurement via the measuring system 16 of FIG. 1, and in particular via a multifunction probe of primary references 20A according to the described technology, will now be described.

First, during a step 200, at least the multifunction probe 20A of primary references is attached to aircraft 14, and advantageously, the measuring system 16 of the described technology.

Next, during a step 210, a measurement of the static pressure around the aircraft 14 is performed via the static pressure taps 32A arranged on the base 28A.

At the same time or later, during a step 220, a measurement of a relative airspeed of the aircraft 14 is performed via laser radiation emitted by the optical head 38A from the inside of the cockpit 18 through the porthole 68A of the optical window 34A, backscattered toward the optical window 34A, then detected by said head 38A through the optical window 34A.

Then, during a step 230 at the same time as or after the steps 210 and 220, a static temperature measurement is performed via the temperature probe 42A.

Lastly, during a step 240, the physical properties relative to the aircraft are computed as a function of the static temperature, the static pressure and the speed of the aircraft measured by the multifunction probe of primary references 20A.

Advantageously, during step 200, the measuring system 16 is attached to the aircraft and, during step 210, the static pressure measurement is performed by at least two of the multifunction probes 20A, 20C, positioned on two opposite sides of the aircraft 14. Then, during step 240, the static pressure and the static temperature corrected for the overall sideslip of the aircraft 14 are obtained from pressure measurements done by two of the multifunction probes 20A, 20c, positioned on two opposite sides of the aircraft 14.

Advantageously, following step 240, the deicing system 48A is controlled as a function of the static temperature computed in step 240. The deicing system is, for example, triggered when the measured temperature is below a temperature threshold determined as a function of results of in-flight tests done for different aircraft. The sensor threshold is for example around 5° C.

Advantageously, the multifunction probe 20A is formed from a pre-existing static pressure probe to which the optical window 34A, the optical head 38A and the temperature probe 42A are added, but without modifying the geometry of the pre-existing static pressure, and consequently without a completely new certification of the anemo-barometry of the aircraft 14 being needed. The multifunction probe 20A according to the described technology thus makes it possible to benefit from a multifunction probe 20A without altering the skin of the aircraft 14.

The multifunction probes of primary references 20A, 20B, 20C make it possible to obtain a complete set of anemo-barometric measurements without using protruding or moving probes and therefore make it possible to obtain measurements not very sensitive to icing, dust and avian impacts, while minimizing the installation sites on the skin of the aircraft 14, which facilitates the placement of the probe, in particular on small aircraft.

The multifunction probes of primary references 20A, 20B, 20C further globally have no impact on the drag of the aircraft 14 and advantageously allow a decrease in the noise perceived inside the aircraft during flight, compared to protruding probes.

The multifunction probes of primary references make it possible to do away with the use of total pressure (Pitot) and/or angle of attack (AOA) of the aircraft and/or total temperature probes.

The multifunction probes also make it possible, if the aircraft is equipped with total pressure (Pitot) and/or angle of attack (AOA) of the aircraft and/or total temperature probes as well as a multifunction probe for primary references, to ensure the redundancy of the anemo-barometric measurements. Thus, a failure of the total pressure (Pitot) and/or angle of attack (AOA) of the aircraft and/or total temperature probes does not affect the aircraft and the piloting of the aircraft, since the anemo-barometric measurements necessary for piloting of the aircraft 14 are then provided by the multifunction probes of primary references.

The multifunction probes of primary references 20A, 20B, 20C provide an independent additional measuring capability, diversified relative to the total pressure and angle of attack probes and redundant if the system comprises other measuring capabilities or several multifunction probes.

Furthermore, the multifunction probe 20A can be mounted on the aircraft 14 when the latter is already in use, by replacing a traditional static pressure probe that it comprises.

Furthermore, the LIDAR probes and the temperature probe 42A situated under the skin of the aircraft 14 are thus not subject to the failures to which protruding probes are exposed, and therefore have an improved uptime.

Furthermore, controlling the deicing system 48A is a function of the temperature measured by the temperature probe 42A makes it possible to improve the piloting of the deicing system and limit its impact on the temperature measurement by controlling the heat that it supplies and optimizing its operating time.

In a first alternative (not shown) of the multifunction probes for primary references, the base 28A does not comprise a deicing system and deicing zone. This alternative is desirably used when the multifunction probes are fastened in locations of the cockpit 18 such that the risks of icing of the multifunction probes are decreased.

Alternatively, the measuring system comprises at least one multifunction reference probe 20A and at least one computing module 22A.

Alternatively, the multifunction probe 20A comprises one or more anemometers, and in particular a single optical head or more than two optical heads connected to corresponding electronic processing devices for example included in the computer 22A. Each optical head is then positioned across from the optical window 34A.

Advantageously, if the multifunction probe 20A comprises more than two optical heads, each optical head is positioned across from the optical window 34A and is inclined relative to the central axis of the optical window 34A, by a different angle.

Alternatively, the temperature probe 42A is for example integral with the base 28A.

According to another alternative, the anemometers comprising the optical heads 38A, 39A form a single anemometer for example comprising two optical heads and a signal processing device able to perform laser anemometry computations.

According to another alternative, the multifunction probes of primary references 20A, 20B, respectively, arranged on the left side face 10, are connected to the multifunction probes of primary references 20C, 20D, respectively, arranged on the right side face 12 via a respective pneumatic link for measuring the static pressure. In this alternative, the static pressure taps 32A of the multifunction probes 20A, 20B, respectively, are connected to the static pressure taps of the multifunction probes 20C, 20D, respectively, via a pneumatic link and the measuring system comprises means for measuring the static pressure at the midpoint of the pneumatic links.

According to another alternative, the temperature probe 42A comprises an additional sensitive element arranged inside the temperature probe 42A, on a wall of the inner part 114A. The additional sensitive element then makes it possible to measure the temperature of the corresponding wall of the inner part and thus to improve the knowledge of the heat exchanges between the inside of the temperature probe 42A and the inside of the aircraft 14, i.e., the housing 26A. The temperature value measured via the sensitive element 102A may then be adjusted based on the heat exchanges taking place.

According to another alternative, the system 16 also comprises a probe measuring the sideslip angle of the aircraft 14, able to send the sideslip angle values that it measures to the computing modules 22A, 22B, 22C, 22D. Advantageously, this probe is a LIDAR probe positioned on the aircraft so as to measure the sideslip angle, and this embodiment makes it possible to form a completely non-protruding measuring system.

The embodiments and alternatives considered above are able to be combined with one another to lead to other embodiments of the invention.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

The invention claimed is:

1. A multifunction probe for primary references for an aircraft, the multifunction probe for primary references including:
   a base configured to be fastened on a cockpit of the aircraft;
   a plurality of static pressure taps arranged through the base and connected to pressure measuring devices;
   an optical window transparent to laser radiation and positioned in the base so as to enable the passage of laser radiation through the base;
   at least one laser anemometry optical head positioned to take laser anemometry measurements through the optical window; and
   a static temperature probe mounted on the base.

2. The multifunction probe for primary references according to claim 1, wherein the optical window has an outer face flush with an outer surface of the base and a first inner face, each optical head being on the side of the first inner face.

3. The multifunction probe for primary references according to claim 1, wherein the static temperature probe comprises a wall having an outer face flush with an outer surface of the base and an inner face, the temperature probe comprising a temperature-sensitive element configured to measure temperature and positioned on the inner face to measure the static temperature of a flow of air in contact with the outer face through the wall.

4. The multifunction probe for primary references according to claim 1, comprising a deicing system for the static pressure taps, configured to control deicing as a function of the temperature measured by the static temperature probe.

5. The multifunction probe for primary references according to claim 1, wherein the base defines a receiving orifice for the static temperature probe, wherein the multifunction probe of primary references comprises a thermal insulating seal for the static temperature probe relative to the base, inserted between the base and the static temperature probe, and wherein the temperature probe comprises a thermal insulating device on its periphery.

6. An anemo-barometric measuring system for an aircraft comprising at least one multifunction probe of primary references connected to at least one device for computing physical properties relative to the aircraft as a function of measurements performed by the at least one multifunction probe of primary references, at least one of the multifunction probes of primary references being according to claim 1.

7. The system according to claim 6, wherein each computing device is configured to compute one or more physical properties relative to the aircraft selection from among:
   a total temperature of the air moving around the aircraft;
   a true airspeed;
   a computed speed;
   an indicated speed;
   an angle of attack;
   a sideslip;
   a pressure altitude;
   a corrected pressure altitude;
   a standard altitude;
   a barometric rate of climb and the Mach number of the aircraft, as a function of the measurements of the static temperature;
   a static pressure; and
   a local speed of the aircraft taken by each multifunction probe.

8. An aircraft comprising at least one multifunction probe for primary references according to claim 1.

9. The aircraft according to claim 8, wherein for each multifunction probe of primary references, the temperature probe is closer to the ground than the static pressure taps, in the standard flight configuration of the aircraft.

10. A method for obtaining a plurality of physical properties relative to an aircraft, comprising:
   providing a multifunction probe for primary references according to claim 1, on a cockpit of the aircraft;

measuring a static pressure near the aircraft via the static pressure taps;

sending/receiving laser radiation from the inside of the aircraft to the outside of the aircraft through the optical window via the optical head to measure a speed of the aircraft;

measuring a static temperature via the static temperature probe; and computing physical properties as a function of the measured static temperature, static pressure and speed of the aircraft.

11. A multifunction probe for primary references for an aircraft, the multifunction probe for primary references including:

abase configured to be fastened on a cockpit of the aircraft; a plurality of static pressure taps arranged through the base and connected to pressure measuring devices;

an optical window transparent to laser radiation and positioned in the base so as to enable the passage of laser radiation through the base;

at least one laser anemometry optical head positioned to take laser anemometry measurements through the optical window; and a static temperature probe mounted on the base, wherein the static pressure taps, the static temperature probe and each optical head are configured to perform measurements near another, at measuring points situated in a cylindrical volume of revolution, centered on axis globally perpendicular to the base, with a diameter less than about 30 cm and a height less than about 50 cm.

12. A multifunction probe for primary references for an aircraft, the multifunction probe for primary references including:

a base configured to be fastened on a cockpit of the aircraft;

a plurality of static pressure taps arranged through the base and connected to pressure measuring devices;

an optical window transparent to laser radiation and positioned in the base so as to enable the passage of laser radiation through the base;

at least one laser anemometry optical head positioned to take laser anemometry measurements through the optical window;

a static temperature probe mounted on the base; and a deicing system for the static pressure taps, configured to control deicing as a function of the temperature measured by the static temperature probe, wherein the temperature probe is closer to the ground than the static pressure taps, in the standard flight configuration of the aircraft.

* * * * *